Figure 2:
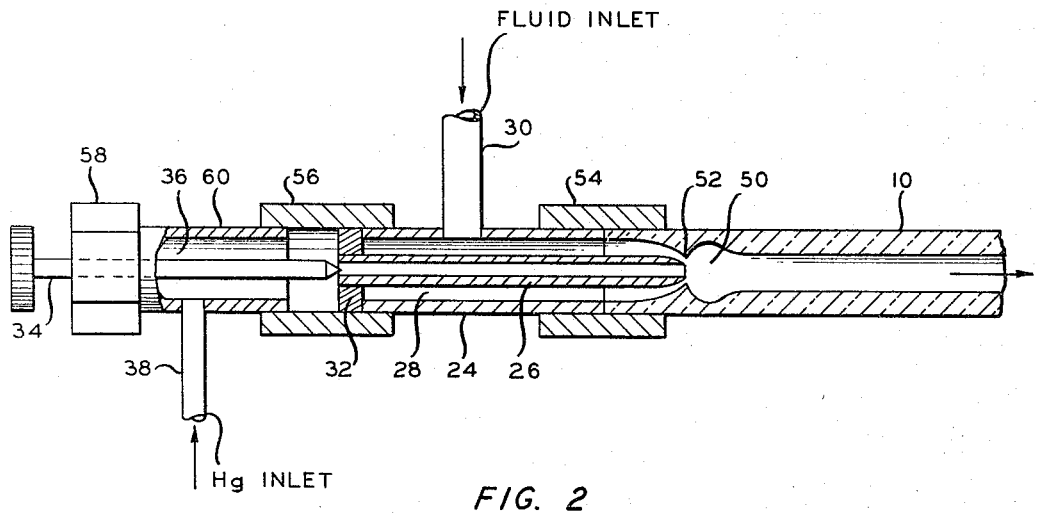

March 14, 1967    D. D. DE FORD    3,308,660
HIGH PRECISION FLOW METER
Filed June 15, 1964

INVENTOR.
D. D. DeFORD
BY Young & Quigg
ATTORNEYS

3,308,660
HIGH PRECISION FLOW METER
Donald D. De Ford, Glenview, Ill., assignor to Phillips
Petroleum Company, a corporation of Delaware
Filed June 15, 1964, Ser. No. 375,114
6 Claims. (Cl. 73—194)

This invention relates to apparatus for precisely measuring fluid flow rates in relatively small streams.

Some studies in gas chromatography require a precise measurement of flow changes in the column during the elution of peaks only few seconds wide. No known instruments were available for precisely measuring flow rates or flow change of this nature.

Accordingly, it is an object of the invention to provide an improved and precise flow meter for measuring fluid flow rates in relatively small streams. Another object is to provide a flow meter which is relatively simple and applicable for observing flow rates of liquid or gases in small streams. Other objects of the invention will become apparent to one skilled in the art upon consideration of the accompanying disclosure.

A broad aspect of the invention comprises flow meter apparatus for passing a stream of fluid to be metered thru a tube of small bore and introducing into the bore of the tube a drop of a fluid immiscible with the fluid being metered so that the drop occupies the entire cross section of the bore and moves thru the bore at the fluid flow rate of the stream being metered. The time of flow of the drop thru a section of the tube of known volume is measured and the flow rate of the fluid is determined in known manner from the measured time and volume. The apparatus comprises a tube of relatively small bore having an inlet for a first fluid at one end and an outlet for this fluid at the opposite end; means adjacent the inlet end for introducing individual drops of a second fluid immiscible with the first fluid at spaced time intervals; means for sensing the passage of the drops thru separate spaced-apart points along the tube; and means responsive to the sensing means for measuring the time interval between the sensing at the sensing points. A specific embodiment of the invention utilizes a capillary tube having two pairs of electrodes at substantially spaced-apart locations in the bore of the tube along the line of flow. Means for injecting droplets of mercury at spaced intervals into the upstream end of the tube is provided so that as each drop of mercury moves thru the tube at the same rate as the gas flowing therein, contact is made consecutively with the pairs of electrodes to complete separate circuits at the two sensing points. The upstream electrodes are connected with an oscillator or other type of electronic counter so as to start the oscillator, and the downstream electrodes are connected with another set of contacts on the oscillator which stop the instrument. The number of oscillations per second of the instrument is known and the time of flow between the sensing points is readily computed from the number of oscillations occurring during each travel of the mercury droplet from one pair of electrodes to another.

Figure 1:
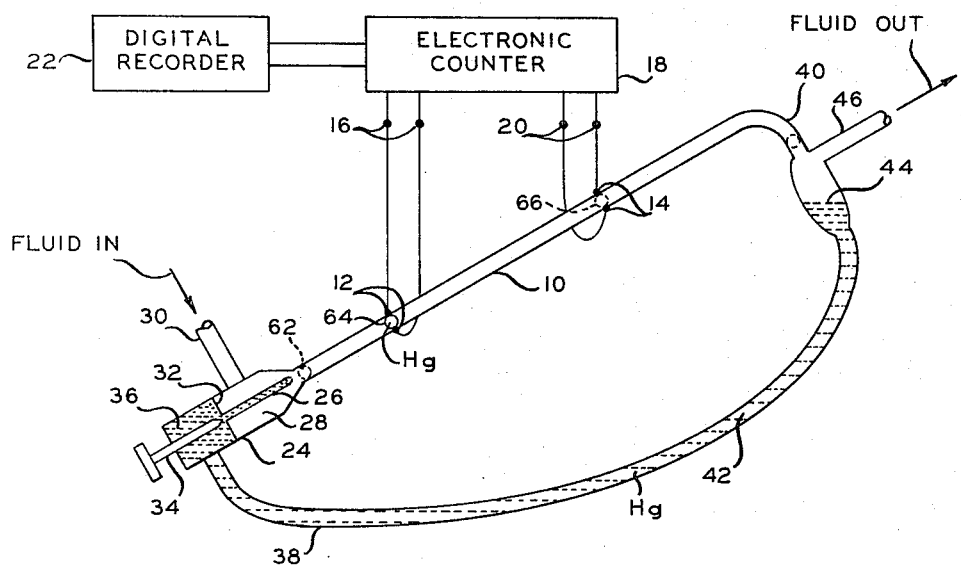

A more complete understanding of the invention may be had by reference to the accompanying schematic drawing of which FIGURE 1 is an elevation showing a preferred embodiment of the invention and FIGURE 2 is a fragmentary view in partial section of the lower end of the device of FIGURE 1.

Referring to the drawing a glass capillary tube 10 is provided with a first pair of electrodes 12 and a second pair of electrodes 14 spaced apart in the bore of the tube a substantial distance. Electrodes 12 are connected with starting contacts 16 of an electronic counter 18 while electrodes 14 are in circuit with contacts 20 in the stopping circuit of counter 18. While the time interval of flow from electrodes 12 to 14 can be computed from a reading of instrument 18, it is preferred to connect counter 18 with a digital or other type recorder 22 for recording the time interval automatically. Other means may be utilized for determining the time interval for flow of the droplet between electrodes 12 and 14.

The inlet end of tube 10 comprises an expanded section 24 containing an axial pipe 26 and forming an annular passageway 28 therewith. Fluid inlet 30 connects with passageway 28 to provide flow of the fluid to be measured into the inlet end of tube 10. Pipe 26 communicates at its downstream end with the bore of tube 10 and is sealed off from the passageway 28 by partition 32 adjacent its upstream end. An axially aligned needle valve 34 is adjustable longitudinally to position the conical end thereof in the inlet end of pipe 26. This needle valve functions in conventional manner to control the rate at which fluid enters pipe 26. A chamber 36 surrounds needle valve 34 and is connected with a source of liquid such as mercury as in tube 38.

Downwardly directed conduit 40 communicates with the downstream end of tube 10 and with tube 38 for the return of mercury or other liquid droplets to tube 38. As illustrated, mercury 42 in tube 38 extends to a level 44 and provides a fluid head for forcing mercury thru pipe 26 around needle valve 34 and into the bore of tube 10. Line 46 conducts effluent gas from the meter to any suitable disposal.

The injection means for mecury or other fluid into the fluid stream being measured or metered is shown in more detail in FIGURE 2. The bore of tube 10 is provided with a bulb-shaped expanded section 50 with a constriction 52 at the upstream end thereof. Pipe 26 extends into the upstream end of section 50 or to a location just within constriction 52. Pipe 26 is fabricated of nylon and tube 10 is a glass tube. All of the other elements including connectors 54 and 56, cap 58, needle valve 34, conduit 60, and conduit 24 are fabricated of stainless steel so as to avoid corrosion from the mercury utilized in the apparatus and process.

In operation the fluid to be metered, which may be a gas or liquid, is introduced thru conduit 30 into annular passageway 28 from which it flows into expanded section 50 around the end of pipe 26 into the bore of tube 10 and on thru the tube, egressing thru line 46. Mercury is fed thru tube 38 into chamber 36 from which is passes past needle valve 34 into the bore of pipe 26. A droplet of mercury periodically emerges from the end of pipe 26 into expanded section 50 and then moves along thru the bore of tube 10 at the fluid flow rate in the stream introduced thru inlet 30. In FIGURE 1 droplet 62 has just emerged from the end of pipe 26. As this drop of mercury arrives at electrodes 12, as illustrated by numeral 64, contact is made with the electrodes and a circuit is completed energizing or emitting a signal to counter 18. When this droplet reaches the position indicated by numeral 66, contact is made with electrodes 14 and another signal is emitted to the counter so that the time interval for passage of the drop and gas from electrodes 12 to electrodes 14 is measured. The drop of mercury then passes on thru the tube and is separated from the gas as it falls into the reservoir of mercury 44 in tube 38.

When utilizing recorder 22, the flow rate is automatically recorded by this instrument.

Utilizing the specific arrangement and structure shown in FIGURE 1, the slope of the tube is variable to change the liquid head of mercury on the mercury feeding device. This has an effect on the rate at which drops of mercury are passed into the bore of tube 10. Regulation of needle valve 34 to control the rate of flow of mercury is also feasible. By the control of these two factors, the rate of injecting drops of mercury into tube 10 is controllable within wide limits. This renders the device and process adaptable to measuring rapidly changing flow rates in a stream of liquid such as occurs in chromatographic analyzers.

Bulb-shaped, expanded section 50 in tube 10 facilitates drop formation of the proper size. As mercury enters this section from pipe 26, it builds up in size sufficient to substantially block passage of gas into the bore of tube 10. When this occurs, the gas flow pushes the droplet into the tube bore so that it moves along this bore at the gas flow rate occurring at that particular time. The flow rate of mercury is adjusted as heretofore indicated so that a new droplet forms and starts thru the tube approximately at the time the first droplet returns to the reservoir. However, the rate can be stepped up so that a new droplet starts on its course thru the flow meter as soon as the preceding one has passed electrodes 14. Operation is thus continuous, with one measurement of flow being obtained for each droplet. A model constructed substantially in accordance with the structure shown in FIGURES 1 and 2 readily provides a frequency of 1 to 4 measurements per second, but it is feasible to construct a flow meter in accordance with the invention which measures at high and lower frequencies. The range of flow rates covered and the rate of repeated measurements is determined by the length and diameter of tube 10, the electrode spacing, the mercury flow rate into tube 10, and other controllable factors. The device is operable under pressure or vacuum if desired. The pressure drop of the fluid whose flow rate is being measured is very small, being of the order of 5 mm. of mercury, depending upon conditions. The precision of the device is very excellent, the average deviation for a constant flow rate being of the order of $\pm 0.2\%$. This can be improved by more careful design and construction in accordance with the invention.

The instrument constructed utilized an electronic counter, model 521E, Hewlett Packard, of Palo Alto, California (Spec. HO5521E). The electrodes in the glass tube were platinum. Tube 10 in the device constructed had an inside diameter of 1.2 mm. and the distance between electrodes was 7.5 cm. The volume between electrodes was 0.1695 cm.$^3$. The crystal oscillator in counter 18 operated at a frequency of 100,000 cycles per second. Thus, a flow rate of 60 cc./min, or 1 cc./sec. would cause the mercury droplet to traverse the distance between the electrodes in 0.1695 sec., and the counter would register 16,950 counts. With a flow rate of 30 cc./min., the counter would register 33,900 counts, etc. Up to about six flow measurements per second could be made at a flow rate of 60 cc./min., and up to about three measurements per second could be made at a flow rate of 30 cc./min., etc.

The diameter of the metering tube may vary in the range of 0.25 mm. up to 5 mm., depending upon the specific application of the process and apparatus. With this range of tube sizes, flow rates in the range of 0.1 cc./min. up to 1000 cc./min. are feasible.

Increasing the distance between electrodes gives greater resolution by providing more counts per counting interval. At higher flow rates with the electrodes closer together, fewer counts per counting interval are provided but more counting intervals for a given length of time are available.

The invention is applicable to the metering of both liquids and gases, utilizing a drop material which is immiscible and not readily volatile in the fluid being metered. It is also within the scope of the invention to utilize photocells at spaced locations along the metering tube instead of electrodes for detection of the desired interval. Also the frequency of the oscillator may be changed to accommodate different flow rates to suit specific requirements in various applications.

Certain modifications of the invention will become apparent to those skilled in the art and the illustrative details disclosed are not to be construed as imposing unnecessary limitations on the invention.

I claim:
1. A fluid meter comprising in combination:
 (a) a tube of droplet-size bore having a fluid inlet at one end and a fluid outlet at the other end;
 (b) a first pair of facing electrodes in said bore;
 (c) a second pair of facing electrodes in said bore substantially spaced from said first pair and defining a predetermined bore volume between the two pairs of electrodes;
 (d) a pipe of small bore extending into the fluid inlet of (a) for injection of mercury droplets into said tube;
 (e) a source of mercury connected with the pipe of (d); and
 (f) a needle valve in the delivery end of the pipe of (d) communicating with the mercury source of (e) for regulating the flow of droplets of mercury into said pipe.

2. The flow meter of claim 1 including:
 (g) a downwardly extending conduit connecting with said tube adjacent the outlet end thereof for recovering mercury drops flowing thru said tube; and
 (h) a conduit connecting the conduit of (g) with the pipe of (d).

3. The flow meter of claim 1 including:
 (g) an electronic counter in circuit with the pairs of electrodes of (b) and (c) for sensing the time interval of flow of mercury between said pairs of electrodes; and
 (h) a recorder in the circuit with the counter of (g) for recording the time interval sensed by said counter.

4. A fluid flow meter comprising in combination:
 (a) a tube of droplet-size bore having a fluid inlet at one end and a fluid outlet at the other end;
 (b) first and second pairs of facing electrodes in said bore having leads extending outwardly from said tube, said pairs of electrodes being separated by a section of bore of known volume;
 (c) a pipe of droplet-size bore positioned coaxially of the tube of (a) with its delivery end adjacent the inlet of (a) forming a narrow annular passageway for gas therewith;
 (d) a conduit coaxially surrounding the pipe of (c) and forming an annulus therewith leading into the tube of (a) thru the narrow passageway of (c), said annulus being closed at a locus remote from said passageway;
 (e) a fluid inlet to the annulus of (d);
 (f) an enclosed chamber adjacent the inlet end of the pipe of (c) having an inlet for mercury;
 (g) an adjustable needle extending thru the chamber of (f) axially of the pipe of (c) to form a narrow annulus with the inlet end thereof; and
 (h) means connected in circuit with the pairs of electrodes of (b) for sensing the passing of a mercury droplet between each pair of said electrodes.

5. The flow meter of claim 4 including a bulb-shaped expanded section in the bore of the tube of (a) at the inlet end thereof.

6. A fluid flow meter comprising in combination:
 (a) a tube of droplet-size bore having a fluid inlet at one end and a fluid outlet at the other end;
 (b) first and second pairs of facing electrods in said bore having leads extending outwardly from said tube, said pairs of electrodes being separated by a section of bore of known volume;
 (c) a pipe of droplet-size bore positioned coaxially of the tube of (a) with its delivery end adjacent the inlet of (a) forming a narrow annular passageway for gas therewith;
 (d) a conduit coaxially surrounding the pipe of (c)

and forming an annulus therewith leading into the tube of (a) thru the narrow passageway of (c), said annulus being closed at a locus remote from said passageway;

(e) a fluid inlet to the annulus of (d);

(f) an enclosed chamber adjacent the inlet end of the pipe of (c) having an inlet for mercury; and (g) an adjustable needle extending thru the chamber of (f) axially of the pipe of (c) to form a narrow annulus with the inlet end thereof.

References Cited by the Examiner

UNITED STATES PATENTS

| | | | |
|---|---|---|---|
| 1,616,481 | 2/1927 | Allen | 73—194 |
| 2,353,382 | 7/1944 | Barrett | 73—194 |
| 2,914,941 | 12/1959 | Frenzl | 73—147 |
| 3,248,941 | 5/1966 | McArthur | 73—194 |

FOREIGN PATENTS 878,112   6/1953   Germany.

OTHER REFERENCES

"Mercury Slug Flowmeter" by Yudowitch, Analytical Chemistry, vol. 20, 1948, p. 86.

"Constant-Pressure Leak-Rate Gage," by K. W. Ehlers, University of California, Berkeley, printed for U.S. Atomic Energy Commission, UCRL–3951, 4 pages.

RICHARD C. QUEISSER, *Primary Examiner.*

E. D. GILHOOLY, *Assistant Examiner.*